United States Patent [19]

Sakane et al.

[11] Patent Number: 5,093,467
[45] Date of Patent: Mar. 3, 1992

[54] PRODUCTION OF POLY(ARYLENE SULFIDE SULFONE) WITH EXCESS WATER TO ALKALI METAL SULFIDE

[75] Inventors: Takehiko Sakane; Toshikazu Kato; Kensuke Ogawara, all of Mie, Japan

[73] Assignee: Tosoh Corporation, Yamaguchi, Japan

[21] Appl. No.: 369,962

[22] Filed: Jun. 22, 1989

[30] Foreign Application Priority Data

Jun. 23, 1988 [JP] Japan ................... 63-153602

[51] Int. Cl.$^5$ ............................................ C08G 75/16
[52] U.S. Cl. ................... 528/388; 528/171; 528/226
[58] Field of Search .................. 528/388, 171, 226

[56] References Cited

U.S. PATENT DOCUMENTS

| | | | |
|---|---|---|---|
| 3,354,129 | 11/1967 | Emonds, Jr. et al. | 260/79 |
| 4,016,145 | 4/1977 | Campbell | 260/79 |
| 4,102,875 | 7/1978 | Campbell | 528/388 |
| 4,127,713 | 11/1978 | Campbell | 528/391 |
| 4,301,274 | 11/1981 | Campbell | 528/388 |
| 4,808,698 | 2/1989 | Bobsein et al. | 528/388 |

FOREIGN PATENT DOCUMENTS 0280325 8/1988 European Pat. Off.
62-190228 8/1987 Japan.

OTHER PUBLICATIONS

Patent Abstracts of Japan, vol. 12, No. 40(C-474(2887) (1987).

Primary Examiner—Harold D. Anderson
Attorney, Agent, or Firm—Sughrue, Mion, Zinn Macpeak & Seas

[57] ABSTRACT

An improved process for producing poly(arylene sulfide sulfone) of increased molecular weight is provided. The process employs an Li salt of $C_1$–$C_{20}$ carboxylic acid as a polymerization auxiliary and is carried out in an organic amide solvent by reacting a dihalogenated aromatic sulfone with an alkali metal sulfide in the presence of 10–15 moles of water per mole of the alkali metal sulfide at temperatures within the range of from 160° C. to 230° C.

12 Claims, No Drawings

PRODUCTION OF POLY(ARYLENE SULFIDE SULFONE) WITH EXCESS WATER TO ALKALI METAL SULFIDE

This invention relates to a process for producing poly(arylene sulfide sulfone).

Poly(arylene sulfide sulfone) materials are generally classified as amorphous, heat resistant resins and are expected to be useful in the production of electrical and electronic parts and automotive parts, as well as in fields where amorphous and heat resistance properties are required.

Poly(arylene sulfide sulfone) may be prepared by a process comprising reacting a dihalogenated aromatic sulfone with an alkali metal sulfide such as sodium sulfide in an organic amide solvent such as N-methyl pyrrolidone. This process resembles the process for preparing poly(phenylene sulfide) disclosed in Japanese Patent Publication No. SHO-45-3368. However, the polymer produced by this of process is too low in molecular weight to be satisfactorily used in molding applications, in particular injection molding. Poly(phenylene sulfide) resin which is crystalline in nature may be cross-linked by controlled thermal oxidation in air to increase its molecular weight to a level at which it can be satisfactorily used in molding applications. Poly(arylene sulfide sulfone) which is amorphous in nature should be preferably subjected to further polymerization rather than thermal oxidation cross-linking in order to achieve an increased molecular weight suitable for use in molding, since it is expected to be useful in fields where clarity is important. The thermal oxidation cross-linking treatment tends to cause the resin material to discolor to an undesirable extent.

Thus, there have been various processes for producing poly(arylene sulfide sulfone) with an increased molecular weight through polymerization rather than thermal oxidation cross-linking. For example, U.S. Pat. No. 4,016,145 describes such a process in which an alkali metal carboxylate is added as a polymerization auxiliary in the polymerization system. U.S. Pat. No. 4,127,713 discloses a process in which a sodium carboxylate is added as a polymerization auxiliary with water into the polymerization system. The latter U.S. Pat. states that although addition of water will adversely affect the desired increase in the molecular weight of poly(arylene sulfide sulfone) if a lithium carboxylate is added into the polymerization system, use of a sodium carboxylate will result in achievement of an increased molecular weight with the assistance of added water. Although, both these known processes are to some extent effective in increasing the molecular weight of poly(arylene sulfide sulfone), the resulting products have a level of increased molecular weight which is insufficient to allow them to be successfully used in forming and molding various articles, such as fibers, films, sheets and pipings. Consequently, a further increase in the molecular weight of poly(arylene sulfide sulfone) is needed.

Japanese Patent Public Disclosure (KOKAI) No. SHO-62-190228 teaches the addition of water to the polymerization system in which poly(phenylene sulfide) is being prepared. However, the object and effect of the invention of this patent disclosure are different from those of the present invention.

An object of the present invention is to overcome the above-discussed problem of molecular weight with the prior art poly(arylene sulfide sulfone) materials and, thus, to provide an improved process for producing poly(arylene sulfide sulfone) in which the polymerization is effected at temperatures between 160° C. and 230° C. using a lithium carboxylate auxiliary in the presence of a large proportion of water, i.e. about 10-15 moles of water per mole of the alkali metal sulfide reactant in the polymerization system, so as to significantly enhance the molecular weight increasing effect of the lithium carboxylate auxiliary that has been recognized to be unacceptably low in the prior art.

Accordingly, the present invention provides an improved process for producing poly(arylene sulfide sulfone) comprising reacting a dihalogenated aromatic sulfone with an alkali metal sulfide in the presence of a polymerization auxiliary in an organic amide solvent, characterized in that the polymerization auxiliary used is a lithium carboxylate of the general formula:

RCOOLi 

(wherein R is an organic group having from 1 to 20 carbon atoms) and that the polymerization is effected at a temperature between 160° C. and 230° C. in the presence of water in a proportion of from 10 to 15 moles per mole of the alkali metal sulfide reactant in the reaction system.

The invention will be described in more detail below.

The polymerization auxiliary used in the process comprises one or more lithium carboxylates represented by the general formula:

RCOOLi 

wherein R is an organic group having from 1 to 20 carbon atoms. Examples of organic groups of 1-20 carbon atoms include alkyl, cycloalkyl, aryl, alkylaryl and arylalkyl groups having 1-20 carbon atoms and the above-listed groups containing one or more hetero atoms. Examples of lithium carboxylates which may be mentioned include lithium acetate, propionate, isobutyrate, butyrate, valerate, hexanoate, heptanoate, octanoate, nonanoate, n-decanoate, undecanoate, dodecanoate, octadecanoate, nonadecanoate, heneicosanoate, benzoate, toluylate, ethylbenzoate, cuminate, n-propylbenzoate, 2,3,4-trimethylbenzoate, 2,3,4,5-tetramethylbenzoate, pentamethylbenzoate, naphthoate, anthracenecarboxylate, phenanthrenecarboxylate, phenylacetate and nicotinate and mixtures thereof. The lithium carboxylates may be used either in the anhydrous or hydrate form. The amount of the lithium carboxylate added in the process ranges from 0.05 to 4 moles, preferably from 0.1 to 2 moles, per mole of the alkali metal sulfide. If the lithium carboxylate is added in too small an amount, the molecular weight of the product polymer will not be increased to an acceptable level. On the other hand, use of the lithium carboxylate auxiliary in an unduly large amount would only add to the cost of production and would not be practical for industry.

The water present in a proportion of 10-15 moles, preferably 11-14 moles, per mole of the alkali metal sulfide in the polymerization system according to the invention may be made up by externally added water and/or by hydration water of, for example the alkali metal sulfide and lithium carboxylate used. The water provided by the added water and/or the hydration water should be present, in total, in the specified proportion in the polymerization system, regardless of the relative proportions thereof derived from the added water and the hydration water.

The dihalogenated aromatic sulfones which may be used in the invention are represented by the following formula (1):

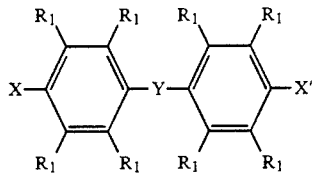

where X and X', which may be the same or different, represent independently fluorine, chlorine, bromine or iodine; groups $R_1$, which may be the same or different, represent independently hydrogen or an organic group having 1-20 carbon atoms; and Y represents $SO_2$ or $SO_2$-Y'-$SO_2$, where Y' is Ar or Ar-Z-Ar (wherein Ar is a divalent unsubstituted arylene group or an arylene group carrying $C_{1-20}$ organic groups(s), Z is O, S, SO, $SO_2$, $CR_2R_3$ or $SiR_2R_3$, where $R_2$ and $R_3$, which may be the same or different, represent independently hydrogen or a $C_{1-20}$ organic group).

Examples of the dihalogenated aromatic sulfones which may be used in the invention include 4,4'-difluorodiphenyl sulfone, 4,4'-dichlorodiphenyl sulfone, 4,4'-dibromodiphenyl sulfone, 4,4'-di-iododiphenyl sulfone, 4-bromo-4'-fluorodiphenyl sulfone, 4-fluoro-4'-iodo-3-methyldiphenyl sulfone, 4,4'-dichloro-2,2'-dimethyldiphenyl sulfone, 4,4'-dibromo-2,2',5,5'-tetramethyldiphenyl sulfone, 4,4'-dichloro-2,2',5,5'-tetrapropyldiphenyl sulfone, 2,2'-dibutyl-4,4'-difluorodiphenyl sulfone, 4,4'-dichloro-2,2',3,3',5,5',6,6'-octamethyldiphenyl sulfone, 1,4-bis(4-chlorophenyl sulfonyl)benzene, 2,4-bis(4-fluorophenyl sulfonyl)toluene, 2,6-bis(4-bromophenyl sulfonyl)naphthalene, 1,5-bis(4-iodophenyl sulfonyl)-7-ethyl-naphthalene, 4,4'-bis(4-chlorophenyl sulfonyl)biphenyl, 4,4'-bis(4-bromophenyl sulfonyl)diphenyl methane, 4,4'-bis(4-bromophenyl sulfonyl)diphenyl ether, 4,4'-bis(4-chlorophenyl sulfonyl)diphenyl sulfide, 4,4'-bis(4-chlorophenyl sulfonyl)diphenyl sulfone, and 5,5'-bis[3-ethyl-4-(4-chlorophenyl sulfonyl)phenyl]nonane and mixtures thereof. 4,4'-Dichlorodiphenyl sulfone is preferred. One or more other dihalogenated aromatic compounds, for example p-dihalogenated benzenes, such as p-dichlorobenzene; m-dihalogenated benzenes, such as m-dichlorobenzene; o-dihalogenated benzenes, such as o-dichlorobenzene; dichloronaphthalene, dibromonaphthalene, dichlorobenzophenone, dichlorodiphenyl ether, dichlorodiphenyl sulfide, dichlorodiphenyl, dibromodiphenyl and dichlorodiphenyl sulfoxide may be used as additional comonomers in a proportion of less than 10 mole % with respect to the dihalogenated aromatic sulfone present. Provided that the linearity of the product polymer is not significantly disturbed, a minor proportion of polyhalogenated aromatic compounds containing three or more halogen atoms per molecule may be additionally employed.

Examples of the alkali metal sulfides which may be used in the invention include sulfides of lithium, sodium, potassium, rubidium and cesium and mixtures thereof which may be used in the hydrate form. The alkali metal sulfide may be prepared by reacting an alkali metal hydrosulfide with an alkali metal base or reacting hydrogen sulfide with an alkali metal base. In the present process, the alkali metal sulfide may be formed in situ prior to introduction of the dihalogenated aromatic sulfone into the reaction system. Of course, the sulfide may be prepared outside the reaction system and then introduced to the system. Of the above-listed alkali metal sulfides, sodium sulfide is preferably used in the process.

The organic amide solvent used in the invention may be cyclic or acyclic. Examples of solvents which may be mentioned include N,N-dimethyl acetamide, N,N-dimethyl formamide, hexamethylphosphoramide, N-methyl-ε-caprolactam, N-ethyl-2-pyrrolidone, N-methyl-2-pyrrolidone, tetramethyl urea and mixtures thereof. Of these, N-methyl-2-pyrrolidone is preferred.

The polymerization temperature in the present process ranges from 160° C. to 230° C., preferably from 190° C. to 210° C. If the temperature is less than 160° C., an unduly prolonged time is required to achieve an acceptable polymerization degree. Use of polymerization temperatures above 230° C. will be accompanied with significant degradation of the resultant polymer. Due to this degradation, the polymerization degree achieved may remain low. The polymerization time depends on the polymerization temperature employed. The lower is the temperature, the longer the time required, while if a higher temperature is used, a shorter time will suffice. Generally, the polymerization time ranges from 10 minutes to 100 hours, preferably from 1 to 15 hours.

In the present process, it is preferable for the alkali metal sulfide and the dihalogenated aromatic sulfone to be employed in a molar ratio of from 1.00:0.90 to 1.00:1.10 (alkali metal sulfide:dihalogenated aromatic sulfone). The proportion of solvent used may vary over a wide range, but preferably ranges from 3 to 30 moles of the solvent per mole of the alkali metal sulfide.

By conducting the polymerization under the above-specified conditions, the product poly(arylene sulfide sulfone) is yielded in granular form. It is therefore possible to recover the product by simply filtering the reaction mixture. The recovered product may be conveniently washed with warm water. By conducting filtration, the organic solvent can also be recovered so that it may be reused in the process.

The product poly(arylene sulfide sulfone) according to the present process should comprise at least 90 mole % of the structural unit of the following formula (2):

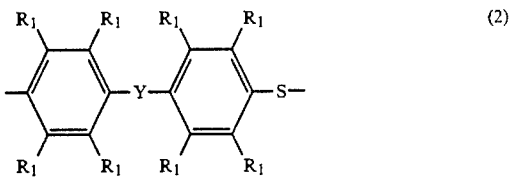

wherein groups $R_1$ and Y are as defined hereinbefore.

The product polymer may optionally comprise less than 10 mole % of the total structural units of comonomeric units, for example, p-phenylene sulfide unit

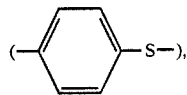

m-phenylene sulfide unit

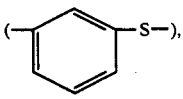

o-phenylene sulfide unit

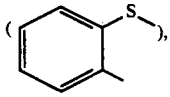

phenylene sulfide ketone unit

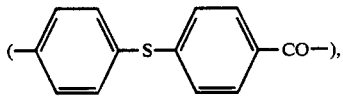

phenylene sulfide ether unit

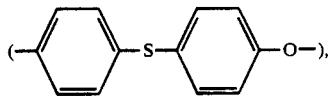

diphenylene sulfide unit

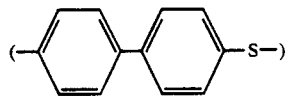

and the like.

Because the present poly(arylene sulfide sulfone) product is linear in its macromolecular structure and also is desirably increased in molecular weight, it is very suitable for use not only in injection molding but also in extrusion molding of such articles as fibers, films, sheets, pipings and the like. If necessary, the polymer may be mixed with an additive before use, for example, reinforcing fillers, such as ceramic fibers (e.g., glass, carbon or alumina fibers), aramide fibers, wholly aromatic polyester fibers, metallic fibers and whiskers (e.g., of potassium titanate); inorganic fillers such as calcium carbonate, mica, talc, silica, barium sulfate, calcium sulfate, kaolin, clay, pyroferrite, bentonite, sericite, zeolite, nepheline syenite, attapulgite, wollastonite, ferrite, calcium silicate, magnesium carbonate, dolomite, antimony trioxide, zinc oxide, titanium oxide, magnesium oxide, iron oxides, molybdenum disulfide, graphite, gypsum, glass beads, powdered glass, glass balloons, quartz, quartz glass; and organic and inorganic pigments.

Further, conventional additives, for example, mold release agents, silane or titanate coupling agents, lubricants, heat stabilizers, weathering agents, nucleating agents, blowing agents, corrosion inhibitors, ion-trapping agents, flame-retardants and flame-proofing aids may be incorporated, if necessary.

If desired, the poly(arylene sulfide sulfone) product of the present invention may be blended with one or more of homopolymers and random or block-graft copolymers based on, for example, polyethylene, polybutadiene, polyisoprene, polychloroprene, polystyrene, polybutene, poly α-methylstyrene, polyvinyl acetate, polyvinyl chloride, poly acrylates, polymethacrylates, polyacrylonitrile, polyamides (e.g., nylon 6, nylon 66, nylon 610, nylon 12, nylon 11, nylon 46), polyesters (e.g., polyethylene terephthalate, polybutylene terephthalate, polyarylate), polyurethanes, polyacetals, polycarbonates, polyphenylene oxide, polyphenylene sulfide, polysulfones, polyethersulfones, polyaryl sulfones, polyether ketones, polyether ether ketones, poly(phenyl sulfide ketone), polyimides, polyamide imides, silicone resins, phenoxy resins and fluorine resins.

EXAMPLE

The invention will be illustrated in more detail with reference to the following examples which are presented only for illustrative purposes and the invention is in no sense limited thereto.

In the Examples, the reduced viscosity was determined at a temperature of 30° C. in a solution containing 0.5 g of polymer per each 100 ml of a mixed solvent comprising phenol and 1,1,2,2-tetrachloroethane in a weight ratio of 3:2.

EXAMPLE 1

A one liter-capacity autoclave was charged with 0.4 moles of sodium sulfide ($Na_2S.2.8H_2O$), 0.4 moles of 4,4'-dichlorodiphenyl sulfone (referred to as DCDPS hereinafter), 400 g of N-methyl-2-pyrrolidone (referred to as NMP hereinafter), 0.2 moles of lithium acetate and 3 moles of distilled water ($H_2O/Na_2S$ ratio=10.3). The temperature was raised to 200° C. and the mixture was allowed to react for 5 hours. On completion of this 5-hour polymerization, the reaction system was cooled and the reaction mixture was filtered. The resulting polymeric product was washed repeatedly with warm water and once with acetone and dried overnight under heat and vacuum to give while granular poly(phenylene sulfide sulfone) in a yield of 99%. The polymer showed a reduced viscosity of 0.65.

The reaction conditions and results are summarized in Table 1.

EXAMPLES 2-8

The general procedure of Example 1 was repeated with various water proportions ($H_2O/Na_2S$ molar ratios), polymerization auxiliaries, temperatures and times. The results are set forth in Table 1.

COMPARATIVE EXAMPLE 1

In an autoclave, 400 g of NMP, 0.765 moles of sodium sulfide ($Na_2S.2.8H_2O$) and 0.383 moles of lithium acetate were mixed. The mixture was heated to 205° C. to distill off 20.5 g of water along with 3.1 g of NMP. Thus an $H_2O/Na_2S$ molar ratio of 1.3 was achieved in the system. After cooling to 100° C., the system was charged with 0.75 moles of DCDPS and an additional amount (100 g) of NMP. The system was reheated to 200° C. and allowed to react at this temperature for a period of 5 hours.

Except for the above, the procedure of Example 1 was repeated. The results are shown in Table 1.

The resulting polymer was powdery. The yield was 94%. The polymer had a reduced viscosity of 0.11. These results are suggestive of the fact that where the ratio of water to sodium sulfide has been unduly reduced due to dehydration of the reaction system, the molecular weight increasing effect of the polymerization auxiliary lithium acetate is seriously diminished.

COMPARATIVE EXAMPLE 2

The procedure of Example 1 was repeated except that the addition of distilled water was omitted ($H_2O/Na_2S=2.8$). The results are shown in Table 1. The resulting polymer (at 97% yield) was powdery and exhibited a reduced viscosity of 0.43. These results are suggestive of the fact that, although the molecular weight of the polymer of this Comparative Example was increased to some extent by the addition of lithium acetate, its reduced viscosity was unsatisfactorily low in comparison with those of Examples 1–8 and a further increase in the molecular weight would be necessary before the polymer could be successfully used in molding applications.

COMPARATIVE EXAMPLE 3

The procedure of Example 1 was repeated except that distilled water was added in an amount of 2 moles instead of 3 moles ($H_2O/Na_2S=7.8$). The results are shown in Table 1. The product polymer was granular. The yield was 99%. The polymer had a reduced viscosity of 0.34. Although the proportion of water was increased in this Comparative Example as compared with Comparative Example 2, the molecular weight increasing effect of the lithium acetate was poor and not acceptable.

COMPARATIVE EXAMPLE 4

The procedure of Example 1 was repeated except that distilled water was added in an amount of 6 moles instead of 3 moles ($H_2O/Na_2S=17.8$). The results are shown in Table 1. The resultant polymer was in the form of agglomerates. The yield was 99%. The polymer had a reduced viscosity of 0.53. This Example indicates that when an excessive proportion of water is present in the polymerization system, the polymerization auxiliary lithium acetate becomes less effective in increasing the molecular weight of the resulting polymer.

COMPARATIVE EXAMPLE 5

The procedure of Example 3 was repeated except that the polymerization stage was conducted at a temperature of 140° C. for a period of 15 hours. The results are shown in Table 1. A powdery polymer was obtained in a yield of 97%. The polymer had a reduced viscosity of 0.42. The results are indicative of the fact that a lower reaction temperature results in a poor increase in the molecular weight.

COMPARATIVE EXAMPLE 6

The procedure of Example 3 was repeated except that the polymerization temperature was 240° C. The results are shown in Table 1. A powdery polymer was obtained in a yield of 96%. The polymer had a reduced viscosity of 0.38. This Example illustrates that excessively high polymerization temperatures adversely affect the action of increasing the molecular weight of the polymer.

COMPARATIVE EXAMPLE 7

The procedure of Example 3 was repeated except that the sodium acetate was used in place of the lithium acetate. The results are shown in Table 1. The polymer was obtained in a yield of 99% and granular. The polymer had a reduced viscosity of 0.44. This Example shows that sodium acetate is less effective in increasing the molecular weight of polymer than lithium acetate.

COMPARATIVE EXAMPLE 8

The procedure of Example 3 was repeated with omission of the polymerization auxiliary. The results are shown in Table 1 below. A granular polymer was obtained in a yield of 99%. The polymer had a reduced viscosity of 0.30. This Example illustrates that the addition of water in the absence of the lithium carboxylate auxiliary is not effective in achieving a polymer with a molecular weight that is increased to a useful extent.

TABLE 1

| | charged DCDPS/NMP (moles/ 1000 g) | charged monomers Na$_2$S/DCDPS (moles/ moles) | H$_2$O/Na$_2$S (moles/ moles) | polymerization auxiliary[*2] | charged auxiliary/ Na$_2$S (moles/ moles) | polymerization temperature (°C.) | polymerization time (hrs.) | yield (%) | reduced viscosity |
|---|---|---|---|---|---|---|---|---|---|
| Ex. 1 | 1.0 | 1.0 | 10.3 | AcOLi | 0.5 | 200 | 5 | 99 | 0.65 |
| Ex. 2 | 1.0 | 1.0 | 11.5 | AcOLi | 0.5 | 200 | 5 | 99 | 0.68 |
| Ex. 3 | 1.0 | 1.0 | 12.8 | AcOLi | 0.5 | 200 | 5 | 98 | 0.76 |
| Ex. 4 | 1.0 | 1.0 | 14.5 | AcOLi | 0.5 | 200 | 5 | 99 | 0.58 |
| Ex. 5 | 1.0 | 1.0 | 12.8 | AcOLi | 0.5 | 160 | 10 | 98 | 0.61 |
| Ex. 6 | 1.0 | 1.0 | 12.8 | AcOLi | 0.5 | 220 | 3 | 99 | 0.63 |
| Ex. 7 | 1.0 | 1.0 | 12.8 | AcOLi | 0.5 | 160 / 200 | 5 / 2 | 99 | 0.71 |
| Ex. 8 | 1.0 | 1.0 | 12.8 | BzOLi | 0.5 | 200 | 5 | 97 | 0.60 |
| Comp. Ex. 1 | 1.5 | 1.02[*1] | 1.3 | AcOLi | 0.5 | 200 | 5 | 94 | 0.11 |
| Comp. Ex. 2 | 1.0 | 1.0 | 2.8 | AcOLi | 0.5 | 200 | 5 | 97 | 0.43 |
| Comp. Ex. 3 | 1.0 | 1.0 | 7.8 | AcOLi | 0.5 | 200 | 5 | 99 | 0.34 |
| Comp. Ex. 4 | 1.0 | 1.0 | 17.8 | AcOLi | 0.5 | 200 | 5 | 99 | 0.53 |
| Comp. Ex. 5 | 1.0 | 1.0 | 12.8 | AcOLi | 0.5 | 140 | 15 | 97 | 0.42 |
| Comp. Ex. 6 | 1.0 | 1.0 | 12.8 | AcOLi | 0.5 | 240 | 5 | 96 | 0.38 |
| Comp. Ex. 7 | 1.0 | 1.0 | 12.8 | AcONa | 0.5 | 200 | 5 | 99 | 0.44 |
| Comp. | 1.0 | 1.0 | 12.8 | — | — | 200 | 5 | 99 | 0.30 |

TABLE 1-continued

| charged DCDPS/NMP (moles/ 1000 g) | charged monomers Na₂S/DCDPS (moles/ moles) | H₂O/Na₂S (moles/ moles) | polymerization auxiliary*² | charged auxiliary/ Na₂S (moles/ moles) | polymerization temperature (°C.) | polymerization time (hrs.) | yield (%) | reduced viscosity |
|---|---|---|---|---|---|---|---|---|
| Ex. 8 | | | | | | | | |

*¹Since dehydration of the reaction system was effected, Na₂S was increased by 2% to compensate for the loss thereof that was expected to be caused by decomposition during the dehydration.
*²Ac = acetyl and Bz = benzoyl.

From the foregoing, it is apparent that the present process for producing poly(arylene sulfide sulfone) is characterized by the presence of water in a proportion as large as 10-15 moles per mole of an alkali metal sulfide reactant in an organic amide solvent and also the selection of suitable polymerization temperatures within a specified range, by the enhanced molecular weight increasing effect exerted by lithium carboxylate auxiliary. The poly(arylene sulfide sulfone) materials produced according to the process are expected to be useful in production of various articles, such as electrical and electronic parts and automotive parts, as well as in other industrial fields where amorphous and heat resistance properties are required, because their increased molecular weight permits them to be successfully employed in injection and other molding processes.

What is claimed is:

1. A process for producing poly(arylene sulfide sulfone) comprising reacting a dihalogenated aromatic sulfone with an alkali metal sulfide in the presence of a polymerization auxiliary in an organic amide solvent, wherein the polymerization auxiliary is a lithium carboxylate of the general formula:

RCOOLi wherein R is an organic group having from 1 to 20 carbon atoms, and polymerization is effected at a temperature between 160° C. and 230° C. in the presence of water in a proportion of from 10 to 15 moles per mole of the alkali metal sulfide reactant.

2. A process according to claim 1 wherein the organic group R is an alkyl, cycloalkyl, aryl, alkylaryl or arylalkyl group, optionally containing one or more hetero atoms.

3. A process according to claim 1 wherein the carboxylic moiety of the lithium carboxylate is acetic, propionic, isobutyric, butyric, valeric, hexanoic, heptanoic, octanoic, nonanoic, n-decanoic, undecanoic, dodecanoic, octadecanoic, nonadecanoic, heneicosanoic, benzoic, tolulic, ethylbenzoic, cuminic, n-propylbenzoic, 2,3,4-trimethylbenzoic, 2,3,4,5-tetramethylbenzoic, pentamethylbenzoic, naphthoic, anthracenecarboxylic, phenanthrenecarboxylic, phenylactic or nicotinic.

4. A process according to claim 1 wherein the lithium carboxylate is present in a proportion of 0.05-4 moles per mole of the alkali metal sulfide.

5. A process according to claim 1 wherein the water is provided in the specified proportion by a member selected from the group consisting of water which is externally added, any hydrated materials present in the process, and water which is externally added and any hydrated materials present in the process.

6. A process according to claim 1 wherein the polymerization is effected at a temperature of 190°-210° C.

7. A process according to claim 1 wherein the polymerization is effected for a period of 10 minutes to 100 hours.

8. A process according to claim 7 wherein the polymerization is effected for a period of 1 to 15 hours.

9. A process according to claim 1 wherein the dihalogenated aromatic sulfone is of formula (1):

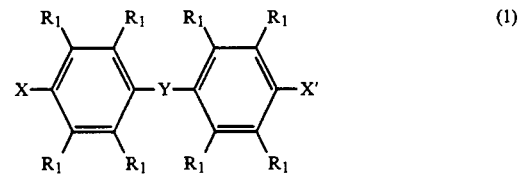

where X and X', which are the same or different, represent independently fluorine, chlorine, bromine or iodine; groups R₁, which are the same or different, represent independently hydrogen or an organic group having 1-20 carbon atoms; and Y represents $SO_2$ or $SO_2$—Y'—$SO_2$, where Y' is Ar or Ar—Z—Ar, wherein Ar is a divalent unsubstituted arylene group or an arylene group having $C_{1-20}$ organic group(s), Z is O, S, SO, $SO_2$, $CR_2R_3$ or $SiR_2R_3$, where $R_2$ and $R_3$, which are the same or different, represent independently hydrogen or a $C_{1-20}$ organic group.

10. A process according to claim 9 wherein, in addition to the dihalogenated aromatic sulfone, one or more other dihalogenated aromatic compounds are reacted in a proportion of less than 10 mole % of the total sulfone compounds.

11. A process according to claim 1 wherein the alkali metal sulfide is lithium, sodium, potassium, rubidium or cesium.

12. A process according to claim 1 wherein the molar ratio of alkali metal sulfide to dihalogenated aromatic sulfone is from 1.00:0.90 to 1.00:1.10.

* * * * *